(12) United States Patent
Garcia et al.

(10) Patent No.: US 10,411,480 B2
(45) Date of Patent: Sep. 10, 2019

(54) RECONFIGURATION OF THE REACTIVE POWER LOOP OF A WIND POWER PLANT

(71) Applicant: VESTAS WIND SYSTEMS A/S, Aarhus N (DK)

(72) Inventors: Jorge Martinez Garcia, Aarhus N (DK); Athanasios Rokofyllos, Aarhus (DK); Kouroush Nayebi, Ikast (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 108 days.

(21) Appl. No.: 15/039,379

(22) PCT Filed: Nov. 3, 2014

(86) PCT No.: PCT/DK2014/050358
§ 371 (c)(1),
(2) Date: May 25, 2016

(87) PCT Pub. No.: WO2015/078471
PCT Pub. Date: Jun. 4, 2015

(65) Prior Publication Data
US 2017/0025858 A1    Jan. 26, 2017

(30) Foreign Application Priority Data
Nov. 28, 2013   (DK) .................................. 2013 70729

(51) Int. Cl.
*H02J 3/38* (2006.01)
*F03D 7/04* (2006.01)
(Continued)

(52) U.S. Cl.
CPC ............ *H02J 3/386* (2013.01); *F03D 7/0284* (2013.01); *F03D 7/048* (2013.01); *F03D 9/25* (2016.05);
(Continued)

(58) Field of Classification Search
CPC . H02J 3/386; H02J 3/1842; H02J 3/46; F03D 9/25; F03D 9/257; F03D 7/0284;
(Continued)

(56) References Cited

U.S. PATENT DOCUMENTS 8,880,228 B2 *  11/2014  Kumar ..................... H02J 3/26
                                                        700/286
9,046,077 B2 *   6/2015  Kirchner ............... F03D 7/0284
(Continued)

FOREIGN PATENT DOCUMENTS

WO     2009/083447 A2    7/2009
WO     2011/150932 A2   12/2011
(Continued)

OTHER PUBLICATIONS

German Claudio Tarnowski et al: "Regulation and frequency response service capability of modern wind power plants", 2010 IEEE Power and Energy Society General Meeting : [IEEE PES-GM 2010], Minneapolis, Minnesota, USA, Jul. 25-29, 2010, IEEE, Piscataway, NJ, USA, Jul. 25, 2010 (Jul. 25, 2010), pp. 1-8.
(Continued)

*Primary Examiner* — Tulsidas C Patel
*Assistant Examiner* — Joseph Ortega
(74) *Attorney, Agent, or Firm* — Patterson + Sheridan, LLP

(57) ABSTRACT

The present invention relates a method of controlling a wind power plant connected to an electrical grid, the wind power plant comprises a power plant controller (350), a plurality of wind turbine generators (1) and a STATCOM (230), with a STATCOM controller, comprises: controlling the plurality of wind turbine generators in a first control mode, with the power plant controller controlling a reactive power production from each of the plurality of wind turbine generators according to a closed loop control scheme, and controlling
(Continued)

in a first control mode with a closed loop control scheme a reactive power production from the STATCOM according to a first setpoint dispatched from the power plant controller, and controlling the reactive power production from the STATCOM in a second control mode from the STATCOM controller according to an electrical measurement in the grid, and controlling the plurality of wind turbine generators in a second control mode, with the power plant controller controlling a reactive power production from the plurality of wind turbine generators, according to a feedforward control or a close loop control, based on a second setpoint from the STATCOM controller, and switching between the first control mode and the second control mode when receiving at least one trigger signal. The invention also relates to a wind power plant according to the method.

11 Claims, 5 Drawing Sheets

(51) Int. Cl.
 F03D 9/00 (2016.01)
 F03D 9/25 (2016.01)
 H02J 3/18 (2006.01)
 H02J 3/46 (2006.01)
 H02P 9/14 (2006.01)
 F03D 7/02 (2006.01)
(52) U.S. Cl.
 CPC ............ F03D 9/257 (2017.02); H02J 3/1842 (2013.01); H02J 3/46 (2013.01); H02P 9/14 (2013.01); F05B 2270/337 (2013.01); Y02E 10/723 (2013.01); Y02E 10/725 (2013.01); Y02E 10/763 (2013.01); Y02E 40/16 (2013.01); Y02E 40/22 (2013.01)
(58) Field of Classification Search
 CPC ...... F03D 7/048; H02P 9/14; F05B 2270/337; Y02E 10/723; Y02E 10/763; Y02E 40/16; Y02E 40/22
 See application file for complete search history.

(56) References Cited

U.S. PATENT DOCUMENTS

| | | | | |
|---|---|---|---|---|
| 10,135,247 | B2* | 11/2018 | Fisher | H02J 3/16 |
| 2003/0011348 | A1* | 1/2003 | Lof | H02J 3/381 |
| | | | | 322/37 |
| 2009/0204266 | A1* | 8/2009 | Lovmand | F03D 7/047 |
| | | | | 700/287 |
| 2010/0025994 | A1* | 2/2010 | Cardinal | F03D 7/0284 |
| | | | | 290/44 |
| 2010/0067526 | A1* | 3/2010 | Lovmand | F03D 7/047 |
| | | | | 370/389 |
| 2010/0259102 | A1* | 10/2010 | Guelbenzu Michelena | |
| | | | | F03D 9/00 |
| | | | | 307/65 |
| 2010/0327599 | A1* | 12/2010 | Nielsen | F03D 9/255 |
| | | | | 290/55 |
| 2010/0332040 | A1* | 12/2010 | Garcia | F03D 7/0284 |
| | | | | 700/287 |
| 2011/0004356 | A1* | 1/2011 | Garcia | F03D 7/0284 |
| | | | | 700/287 |
| 2011/0140428 | A1* | 6/2011 | Wakata | F03D 7/0284 |
| | | | | 290/44 |
| 2011/0204630 | A1* | 8/2011 | Arinaga | F03D 7/0272 |
| | | | | 290/44 |
| 2011/0301769 | A1* | 12/2011 | Lovmand | F03D 7/028 |
| | | | | 700/287 |
| 2012/0029723 | A1* | 2/2012 | Schugart | H02J 3/16 |
| | | | | 700/298 |
| 2012/0112714 | A1* | 5/2012 | Agudo Araque | H02J 3/1842 |
| | | | | 323/210 |
| 2012/0143537 | A1* | 6/2012 | Nielsen | F03D 7/048 |
| | | | | 702/60 |
| 2012/0179301 | A1* | 7/2012 | Aivaliotis | H02J 3/00 |
| | | | | 700/286 |
| 2012/0292904 | A1* | 11/2012 | Tarnowski | H02J 3/386 |
| | | | | 290/44 |
| 2012/0306204 | A1* | 12/2012 | Garcia | H02J 3/1857 |
| | | | | 290/44 |
| 2012/0306277 | A1* | 12/2012 | Garcia | H02J 3/1885 |
| | | | | 307/82 |
| 2013/0015660 | A1* | 1/2013 | Hesselbæk | H02J 3/16 |
| | | | | 290/44 |
| 2013/0073100 | A1* | 3/2013 | Seeley | G01R 19/2513 |
| | | | | 700/290 |
| 2013/0076037 | A1* | 3/2013 | Garcia | H02J 3/1828 |
| | | | | 290/44 |
| 2013/0116841 | A1* | 5/2013 | Garcia | H02J 3/1878 |
| | | | | 700/287 |
| 2014/0062086 | A1* | 3/2014 | Mata Dumenjo | H02J 3/1842 |
| | | | | 290/44 |
| 2014/0100702 | A1* | 4/2014 | Schweitzer | G05B 13/02 |
| | | | | 700/286 |
| 2014/0246914 | A1* | 9/2014 | Chopra | H02J 3/1807 |
| | | | | 307/84 |
| 2014/0282021 | A1* | 9/2014 | Dolezilek | H04L 41/22 |
| | | | | 715/735 |
| 2015/0069836 | A1* | 3/2015 | Beekmann | H02J 3/14 |
| | | | | 307/24 |
| 2015/0105923 | A1* | 4/2015 | Beekmann | F03D 9/007 |
| | | | | 700/287 |
| 2015/0137518 | A1* | 5/2015 | Yin | F03D 7/0284 |
| | | | | 290/44 |
| 2015/0137520 | A1* | 5/2015 | Garcia | H02J 3/1885 |
| | | | | 290/44 |

FOREIGN PATENT DOCUMENTS

WO 2013/044922 A1 4/2013
WO 2013/044923 A1 4/2013

OTHER PUBLICATIONS

Li Wang et al: "Dynamic-stability enhancement and reactive power/voltage control of a large-scale wind farm using a Statcom", North American Power Symposium (NAPS), 2010, IEEE, Piscataway, NJ, USA, Sep. 26, 2010, pp. 1-8.
International Search Report for PCT/DK2014/050358, dated Mar. 6, 2015.
Danish Search Report for PA2013 70729, dated Jun. 17, 2014.
Sizhen Zhao et al: "Assessment of reactive compensation for wind farm integration", Power Engineering Conference, 2009, AUPEC 2009, Australasian Universities, IEEE, Piscataway, NJ, USA, Sep. 27, 2009, pp. 1-6.

* cited by examiner

RECONFIGURATION OF THE REACTIVE POWER LOOP OF A WIND POWER PLANT

The present invention relates to a method for controlling a wind power plant connected to an electrical grid, the wind power plant comprising a power plant controller, a plurality of wind turbine generators and a STATCOM having a STATCOM controller. Further, the present invention relates to a STATCOM, and to a wind power plant of the above-mentioned sort.

BACKGROUND OF THE INVENTION

A wind power plant usually has a plurality of wind turbines for converting wind energy to electricity. Additionally, the wind power plant may comprise a power plant controller (PPC) and/or some sort of reactive power compensation equipment, such as static synchronous compensators (STATCOMs) or switch/switched capacitors, or others.

To supply electricity to the electricity end users, the wind power plant is connected to a power grid. However, before the wind power plant can be connected to a power grid, the wind power plant has to meet the requirements of electrical performance of the wind power plant specified by grid codes. One requirement is an initial response time of the wind power plant. Generally, the wind power plant has a wind power plant controller which monitors a power grid voltage and compares the power grid voltage with an external setpoint. A difference between the actual power grid voltage and the external setpoint (e.g. an error signal) is used to calculate a command for reactive power production for the wind power plant. This command is sent from the wind power plant controller to the individual wind turbines which in turn will respond (e.g. produce more or less power in order to adjust the power grid voltage) upon receiving the command. The error signal may be caused by a change in the actual power grid voltage or a change in the external setpoint.

It is an object of the present invention to improve the voltage control of a wind power plant.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Thus, the above described object and several other objects are intended to be obtained in a first aspect of the invention by providing A method for controlling a wind power plant connected to an electrical grid, the wind power plant comprising a power plant controller, a plurality of wind turbine generators and a STATCOM, the STATCOM having a STATCOM controller, the method comprising:

controlling the plurality of wind turbine generators in a first control mode, with the power plant controller controlling a reactive power production of each of the plurality of wind turbine generators according to a closed loop control scheme, controlling in the first control mode with a closed loop control scheme a reactive power production of the STATCOM according to a first setpoint dispatched from the power plant controller, controlling the reactive power production of the STATCOM in a second control mode from the STATCOM controller according to an electrical measurement in the grid, controlling the plurality of wind turbine generators in the second control mode, with the power plant controller controlling a reactive power production of the plurality of wind turbine generators, according to a feedforward control or a close loop control, based on a second setpoint dispatched from the STATCOM controller, switching between the first control mode and the second control mode when receiving at least one trigger signal.

The invention is particularly, but not exclusively, advantageous as the method enables switching from one control mode to another control mode for the control of the reactive power, voltage or Power Factor in a wind power plant. The three measures control the same, namely the voltage level of the wind power plant. In a wind power system with a need for a fast reactive power control, it can be advantageous to change STATCOM control from slave to master, as the STATCOM often has a faster reactive power control loop, and thus the wind power plant can act faster. Another advantage of the first aspect is that the although the master responsibility of the control is passed to the STATCOM it can be switched back to the power plant controller, whenever the electrical grid is a more steady state operation.

According to one embodiment of the invention, each of the first and second setpoints is a reactive power setpoint, a voltage setpoint or a Power Factor setpoint.

According to one embodiment of the invention, the power plant controller switches from the first control mode to the second control mode. An advantage of this embodiment is that the wind power plant can decrease its response time when fast voltage control is needed, when changing from Slave to Master of the STATCOM.

According to one embodiment of the invention, the power plant controller switches from the second control mode to the first control mode. An advantage of this embodiment is that even though fast control often desired, it also has advantages to operate the power plant controller in Master mode, so after a transient event a change of control mode can take place.

According to one embodiment of the invention, the at least one trigger signal is triggered due to a low voltage event in the electrical grid. An advantage of this embodiment is that the situation where a wind power plant often needs the most reactive power and the fastest response is during a low voltage event, and thus detecting this is important.

According to one embodiment of the invention, the method further comprises synchronizing the first and second control modes of the power plant controller and the first and second control modes of the STATCOM controller, and communicating an alarm to the STATCOM controller and the power plant controller if the first and second control modes of the power plant controller and the first and second control modes of the STATCOM controller are not synchronized.

An advantage of this embodiment is to avoid situations where both the power plant controller and the STATCOM controller operates as Master controller, as they might end up oscillating against each other or like. On the other hand, both controllers in Slave mode is not preferred either, as they will both be waiting for control setpoints.

According to one embodiment of the invention, the method further comprises, dispatching the feedforward setpoint to the plurality of wind turbine generators through the power plant controller. An advantage of this embodiment is that even when the STATCOM controller operates as Master the power plant controller may have a faster dispatching route for dispatching reference setpoint to the wind turbine generators.

According to one embodiment of the invention, the method further comprises measuring an electrical parameter through a measuring point of the power plant controller, and calculating the at least one trigger signal based on the electrical parameter. An advantage of this embodiment is that the power plant controller can monitor the grid and detect a need for change of control mode.

According to one embodiment of the invention, the method further comprises measuring an electrical variable through a measuring point of the STATCOM, and calculating the at least one trigger signal based on the electrical variable. An advantage of this embodiment is that is that the STATCOM can monitor the grid and detect a need for change of control mode.

In a second aspect, the present invention relates to A wind power plant connectable to an electrical grid, the wind power plant comprising a plurality of wind turbine generators, a power plant controller, and a STATCOM, the STATCOM having a STATCOM controller, wherein the power plant controller is arranged to control the plurality of wind turbine generators in a first control mode, where the power plant controller controls a reactive power production of each of the plurality of wind turbine generators according to a closed loop control scheme;

the STATCOM controller is arranged to control, in the first control mode with a closed loop control scheme, a reactive power production of the STATCOM according to a first setpoint dispatched from the power plant controller;

the STATCOM controller is arranged to control the reactive power production of the STATCOM in a second control mode according to an electrical measurement in the grid; and the power plant controller is arranged to control the plurality of wind turbine generators in the second control mode, where the power plant controller controls a reactive power production of the plurality of wind turbine generators, according to a feedforward control or a close loop control, based on a second setpoint dispatched from the STATCOM controller, wherein the wind power plant further comprises a trigger arranged to switch between the first control mode and the second control mode when receiving at least one trigger signal.

In a fourth aspect, the present invention relates to at least one computer program product directly loadable into the internal memory of at least one digital computer, comprising software code portions for performing the steps of the method according to any of claims 1 to 9 when said at least one product is/are run on said at least one computer.

The first, second, third and fourth aspect of the present invention may each be combined with any of the other aspects. These and other aspects of the invention will be apparent from and elucidated with reference to the embodiments described hereinafter.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Typically, in some countries the master controller of the wind power plant is the power plant controller (PPC), and in other countries the STATCOM is the master controller of the wind power plant.

The idea of the present invention is that certain conditions can trigger a change dynamically between STATCOM and PPC as master of the plant.

When doing this, the power plant controller will be reconfigured accordingly.

The present invention includes, among others, a wind power plant with a STATCOM, where the master controller of the plant can be toggled between the STATCOM and the PPC under some scenarios or by user selection.

Figure 1:
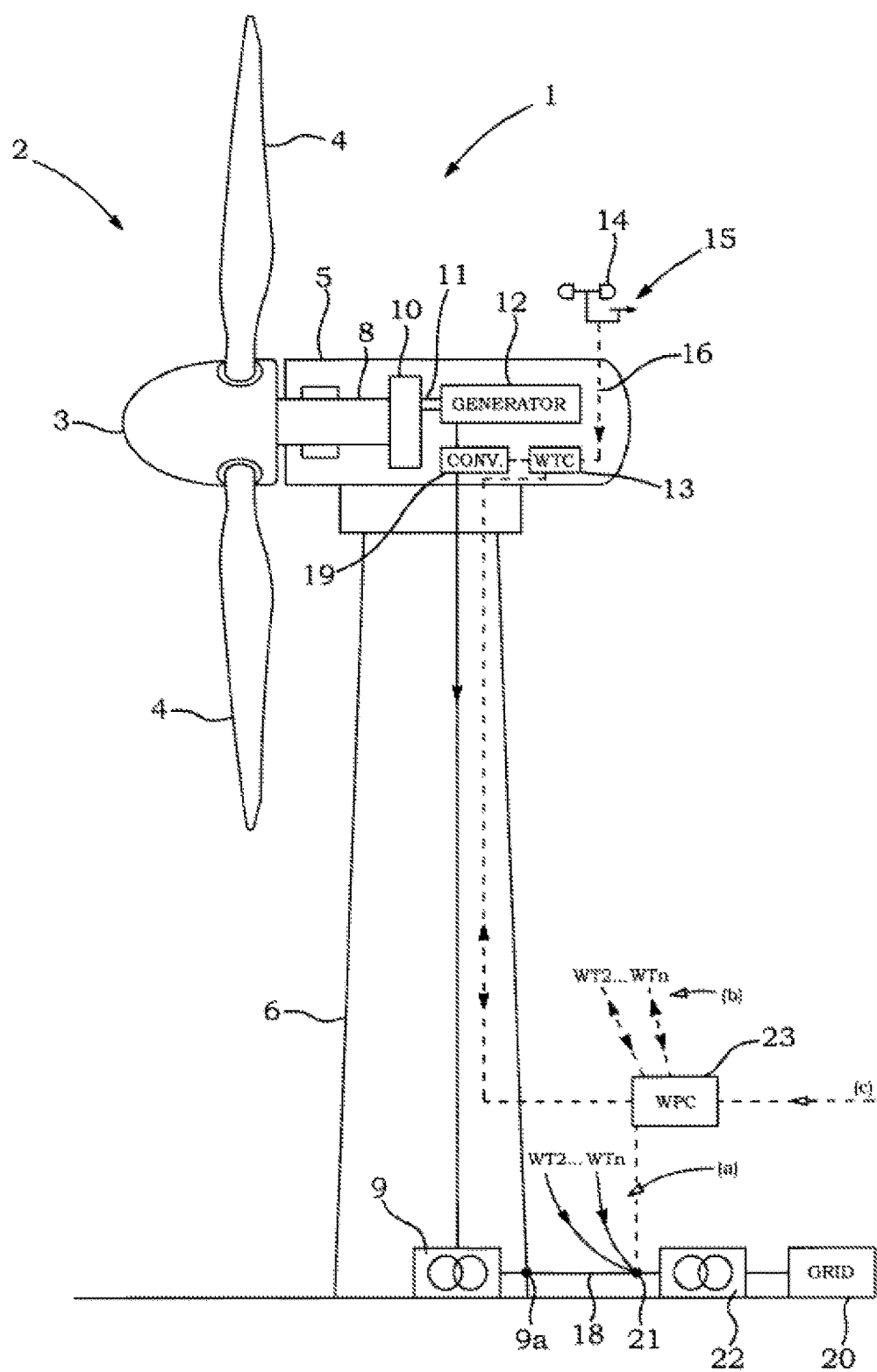
FIG. 1 shows a general structure of a wind turbine.

FIG. 1 shows, an exemplary variable-speed wind turbine generator (WTG, or WT) 1 is one of a plurality of wind turbine generators of a wind power plant (WPP) 2. Each wind turbine generator has a rotor 3 with a hub to which, e.g., three blades 4 are mounted. The pitch angle of the rotor blades 4 is variable by means of pitch actuators. The rotor 3 is supported by a nacelle 5 and drives a generator 12 via a main shaft 8, a gearbox 10, and a high speed shaft 11. This structure is exemplary; other embodiments, for example, use a direct-drive 15 generator.

The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant 2 is fed into a wind power plant grid 18 (symbolized by "a" in FIG. 1). The wind power plant grid 18 is connected at a point of common coupling 21 and via an optional further step-up transformer 22 to a wind power plant external electrical utility grid 20. The grid 20 is equipped with regulation capacity against grid-frequency fluctuations, e.g. in the form of conventional producers which can increase and lower production on a short-time scale to control frequency.

A control system includes a wind turbine controller (WTC) 13 and a wind power plant controller (WPC) 23. The wind turbine controller 13 controls operation of the individual wind turbine generator 1, e.g. selects the full-load or partial-load operation mode, depending i.a. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the wind-park-controller, e.g. an instruction to provide a certain amount of reactive power in addition to the active power, etc. The wind turbine controller 13 uses different input signals to perform its control tasks, for example signals representing current wind conditions (e.g. from an anemometer 14 and a wind vane 15), feed-back signals representing pitch angle, rotor position, amplitudes and phases of the voltage and current at the generator 12 and the terminals 9a, etc., and command signals from the wind power plant controller 23. The wind power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the wind power plant controller 23 monitors grid stability and, upon detection of a reduction of grid stability, commands the wind turbine controllers 13 of the wind turbine generator 1 and the other wind turbine generators of the wind power plant 2 (at "b" in FIG. 1) to change operation by limiting fluctuations of the output power supplied. Upon receipt of such a command the wind turbine controller 13, upon increase of the wind speed, cuts the high-output peak which would then be produced in normal partial-load operation with maximum efficiency, e.g., by adjusting the blade-pitch angle towards the flag position, to comply with the wind-park controller's limit-fluctuation command. Thus, in the exemplary embodiment of FIG. 1 the control task of the control system to limit output fluctuations is shared by the wind power plant controller 23 and the wind turbine controller 13. In other embodiments this control task is performed by the wind turbine controller 13 alone; in those embodiments, the "control system" is represented just by the wind turbine controller 13, without a wind power plant controller. All the electrical power generated by the individual wind turbines generators in the wind farm are consolidated and supplied to the power grid via a Point of Common Coupling (PCC).

Figure 2:
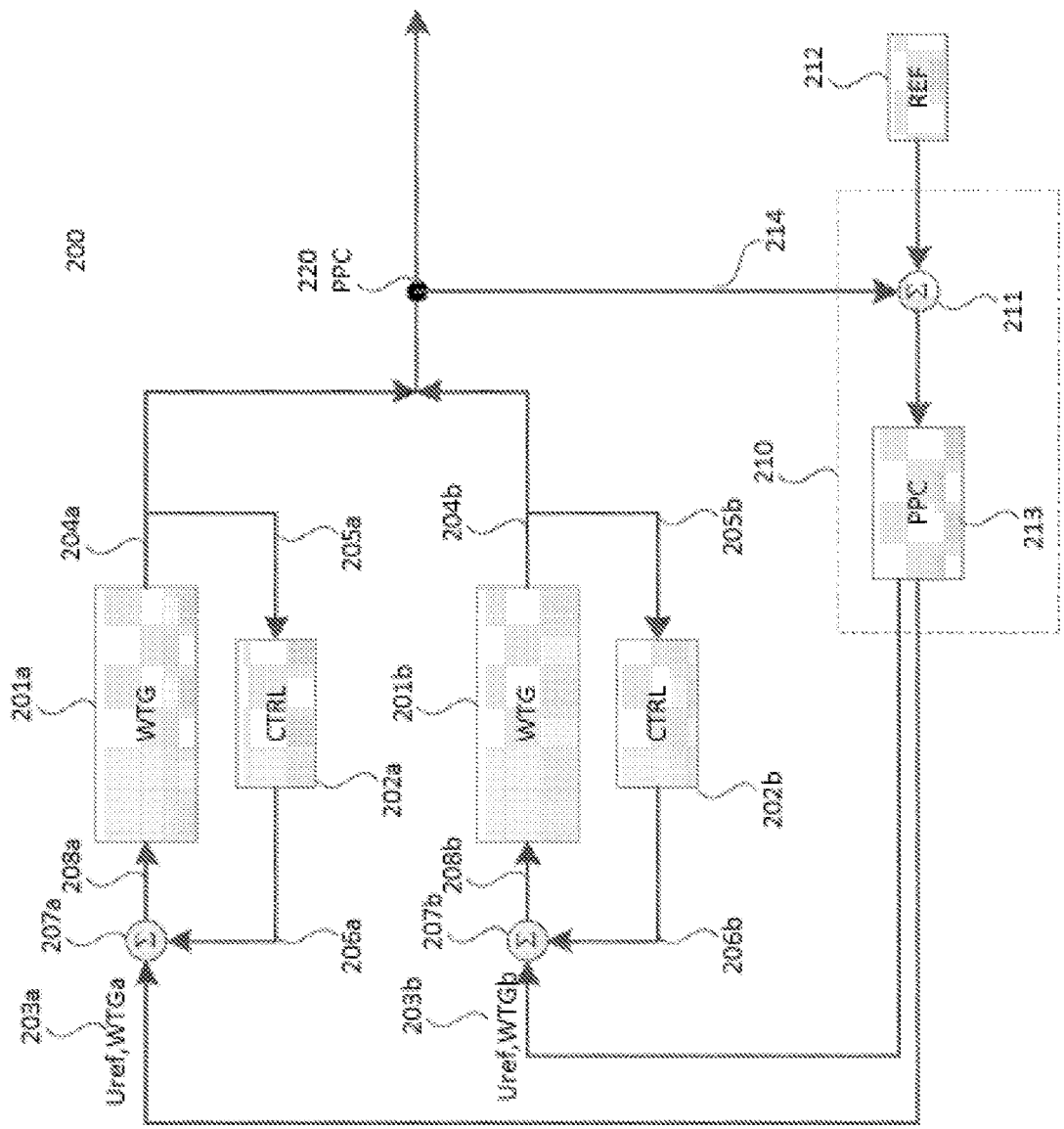
FIG. 2 shows a wind power plant according to the present invention.

FIG. 2 shows a wind power plant 200, with two wind turbine generators 201a, 201 b. The number two is just for simplicity; the wind power plant 200 could include any appropriate number higher than two. The wind turbine generator 201a has an output signal 204a, in this example it is the voltage, (but it could also be understood as an output vector with information about voltage, frequency, reactive and active power or like). The output signal 204a, 204b, respectively, is measured 205a, 205b, respectively, by voltage sensor (not shown) and fed into a voltage controller 202a, 202b, respectively, of the wind turbine generator. The controller 202a, 202b, respectively, generates a voltage setpoint 206a, 206b, respectively, which is compared with a voltage reference $V_{ref}$ 203a, 203b, respectively, from the power plant controller 213 in a summation block 207a, 207b, respectively.

The controller error 208a, 208b is used as a controller parameter in the wind turbine generators 201a. The power plant controller 210 receives measurements 214 of the voltage at the point of common coupling (PCC) 220, obtained by a another voltage sensor (not shown). The measurement 214 is compared to a voltage reference 212 in summation block 211, this reference 212 may have been generated within the power plant controller (PPC) 210 or it may have been supplied externally. The output of the summation block 211 is fed into a PPC voltage controller 213, which dispatches individual voltage references 203a, 203b to the individual wind turbine generators 201.

Although FIG. 2 shows that the wind turbine generators 201a, 201b receive an $V_{ref}$ 203a, 203b, some embodiments may not have the $V_{ref}$ 203a, 203b signal, i.e. if there is no signal from the PPC 210 to the turbine controller 202, 207, the voltage controller at the turbine level 202 controls the voltage level at its own electrical terminals 204.

Each of the voltage references 203a, 203b may, in an embodiment, instead be a reactive power reference. Even if the reference signal is a reactive power reference, the output signal to be measured may be a voltage signal. In other embodiments, it may be a reactive power signal. As mentioned in relation to the output vectors 204a, 204b, similar observations are valid for the power plant dispatched references 203a, 203b, in that these can also be vectors with information on voltage reference, frequency reference, reactive and active power reference. The dispatched signal may be only one value or a selection of the above mentioned references. When the reference is a vector with n values, the controller 202 should be understood as n controllers, each a feedback loop for its respective reference signal.

Additional reactive power compensation equipment is placed at a WPP when the reactive power of the turbines is insufficient to cover what is demanded by the grid code requirement at the PCC.

STATCOM and Mechanically Switched Units (MSUs) are possible to be installed as the additional compensation equipment for reactive balancing of a WPP. Normally the additional compensation equipment is recommended to be installed at the MV collector bus in the substation. As the additional compensation equipment itself is modular, it is advantageous to divide the equipment between the WPP sub-modules. The uniform distribution of the compensating power implies an even response of the voltage and reactive power control, and gives the possibility to operate with reduced capacity in case one of the power plant modules is taken out of operation.

Normally, the use of additional compensation equipment is driven by grid code requirement regarding Q-V behaviour at the PCC, when the turbines are not able to fulfil such requirements by themselves. The selection of the type of additional reactive power compensation equipment to be used will be based on the analysis of the existing grid code requirements on dynamic performance, power quality, etc.

Figure 3:
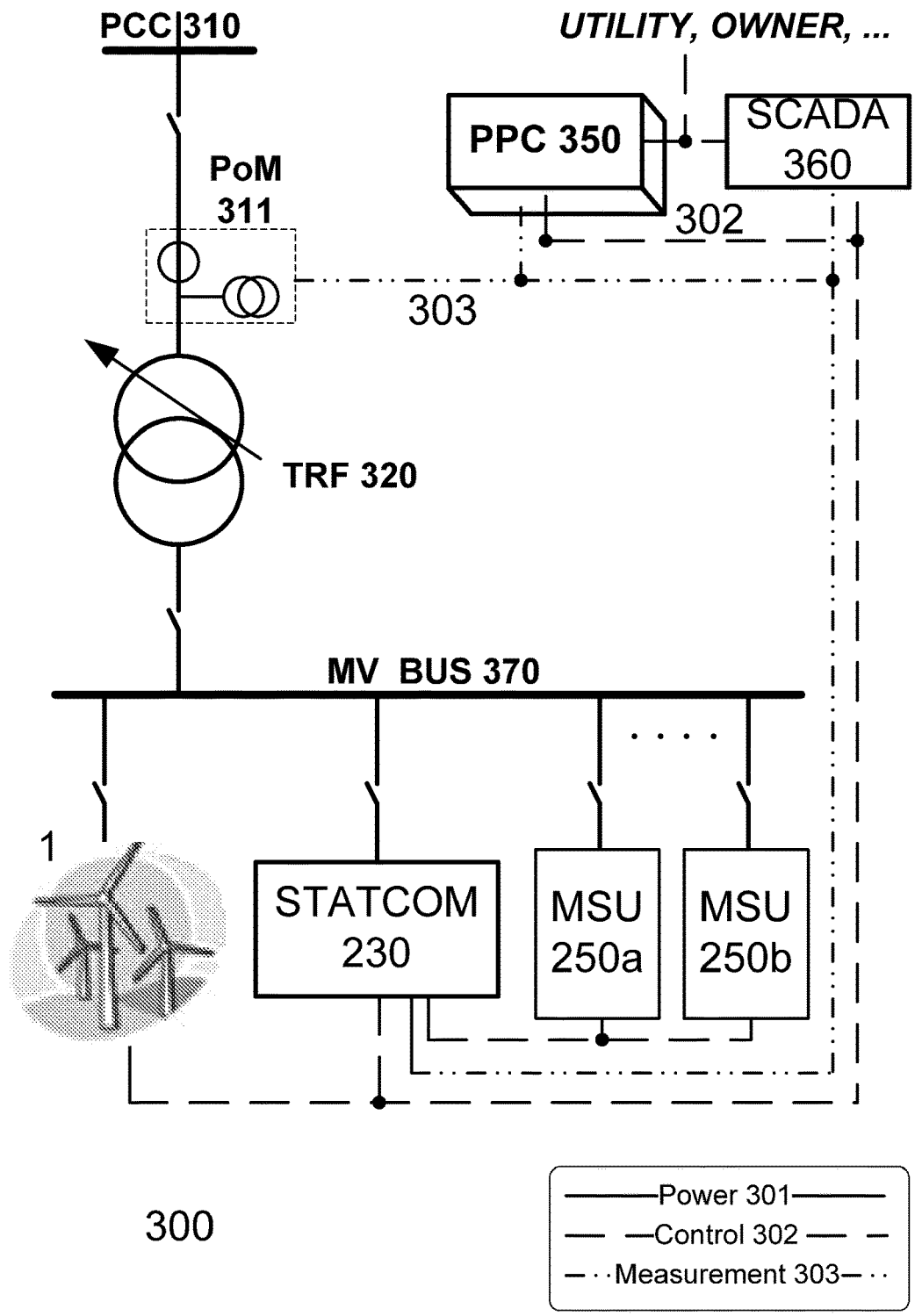
FIG. 3 shows an overall layout of a wind power plant.

A typical wind power plant configuration is shown in FIG. 3. The wind turbines 1 are placed along radial lines, further connected to the MV collector bus 370, normally ranging from 11 kV to 35 kV. The compensation equipment connected at the collector bus may consist of STATCOM 230 and MSUs 250a, 250b. The active and reactive power produced at the MV bus is transported to the PCC via the main transformer 320.

FIG. 3 shows the relevant communication/control links 302 and measurement signals 303. The PPC 350 objective is to fulfil the grid code requirement at the PCC 310 regarding plant electrical performance. Therefore the Point of Measurement (PoM) 311 for three-phase voltages and currents coincides in most of the cases with the PCC 310, unless there are very long distances between the PCC and the location of the PPC 350. The PCC 350 placement can also vary according to the specific project requirements.

The PPC, as the main controller of the WPP, takes care of the power control loops, such as voltage, reactive power and frequency controls by using the reference targets sent by, for instance, the grid operator. The PPC 350 further dispatches the active power and reactive power references to the turbines and the reactive power references to the turbines and the additional reactive power compensation equipment.

The PPC 350 and the SCADA system 360 include several possibilities for data integration to owners and utilities. Through these data interfaces 302, customers and utilities can receive online information regarding the operational state of the wind power plant, for instance:

Produced active power
Available active power
Wind speed
Wind direction
Possible inductive capability
Possible capacitive capability
Number for operational turbines.

Similarly, it is possible to send setpoints for all wind power plant control loops including:

Wind power plant active power setpoint
Wind power plant frequency setpoint
Wind power plant reactive power setpoint
Wind power plant voltage setpoint
Wind power plant power factor setpoint FIG. 3 shows an example of WPP architecture, the MSUs 250 are controlled solely by the STATCOM 230. Alternatively, the PPC can control MSUs if the power plant does not include a STATCOM. Various other equipment, such as instrumentation, switchgear, power meter and protection relay, is not shown in this example for the sake of simplicity.

The Power Plant Controller (PPC) 350 is based on a programmable automation controller. This platform allows the PPC to communicate with remote modules, including multiple communication modules for fast parallel communication with turbines and substation equipment thereby communicating with additional devices which have an Ethernet communication link. A communication protocol is integrated with the PLC, targeting the WTGs within the power plant. The main control signals transmitted via the protocol are the active and reactive power setpoints, the available active and reactive power and status signals of the turbines.

A power meter (not shown in the Figures) is usually located in the PPC or can be remotely connected by a dedicated fast-optical fibre communication channel. Apart from some filtering functions, the power meter calculates the rms values of the feedback signals received from the sensors (PoM) 311. In addition, the power meter can record grid events, such as faults.

The reactive power compensation equipment is possible to be installed on the MV busbar 370 of the substation to increase available reactive power in the power plant. The solution of reactive power compensation by utilizing additional equipment depends on project-specific analysis of the existing requirements. For instance, the STATCOM will be used when the Q-V requirements at the PCC implies high dynamic performance, otherwise MSUs can be used. In most of the cases the STATCOM is complemented by MSU devices, in which case the STATCOM must be configured to control them.

A static synchronous compensator (STATCOM), also known as a "static synchronous condenser" ("STATCON"), is a regulating device used on alternating current electricity transmission networks. It is based on a power electronics voltage-source converter and can act as either a source or sink of reactive AC power to an electric power network.

Usually a STATCOM is installed to support electric power networks that have a poor power factor or a weak grid at the point of common coupling. Hence as wind power plants are often connected to the grid at weak connection points in the grid, it is important to use utilize the control abilities of the STATCOM fully, when the wind power plant is equipped with a STATCOM.

There are however, other uses, the most common use is for voltage stability. A STATCOM is a voltage source converter (VSC)-based device, with the voltage source behind a reactor. The voltage source is created from a DC capacitor and therefore a STATCOM has very little active power capability. However, its active power capability can be increased if a suitable energy storage device is connected across the DC capacitor.

In some embodiments the wording STATCON is expanded to also include an energy storage system for active power, as the VSC converter in the STATCOM can also operate as a source of active power, if the DC capacitor is connected to an energy storage system, with much larger storage capacity compared to what is normally used in a STATCOM, i.e. if connected to a source of power it can also provide active AC power.

The reactive power at the terminals of the STATCOM depends on the amplitude of the voltage source. For example, if the terminal voltage of the VSC is higher than the AC voltage at the point of connection, the STATCOM generates reactive current; on the other hand, when the amplitude of the voltage source is lower than the AC voltage, it absorbs reactive power. The response time of a STATCOM is shorter than that of an SVC, mainly due to the fast switching times provided by the IGBTs (a type of high power transistor) of the voltage source converter. The STATCOM also provides better reactive power support at low AC voltages than an SVC, since the reactive power from a STATCOM decreases linearly with the AC voltage (as the current can be maintained at the rated value even down to low AC voltage).

A static VAR compensator (SVC) can also be used for voltage stability. However, a STATCOM has better characteristics than a SVC. When the system voltage drops sufficiently to force the STATCOM output current to its ceiling, its maximum reactive output current will not be affected by the voltage magnitude. Therefore, it exhibits constant current characteristics when the voltage is low under the limit. In contrast the SVC's reactive output is proportional to the square of the voltage magnitude. This makes the provided reactive power decrease rapidly when voltage decreases, thus reducing its stability. In addition, the speed of response of a STATCOM is faster than that of an SVC and the harmonic emission is lower. On the other hand STATCOMs typically exhibit higher losses and may be more expensive than SVCs, so the (older) SVC technology is still widespread.

In this present invention both STATCOMs and SVCs can be used, although the full the advantage of the present invention is achieved with the STATCOM, and fast response time.

Figure 4:
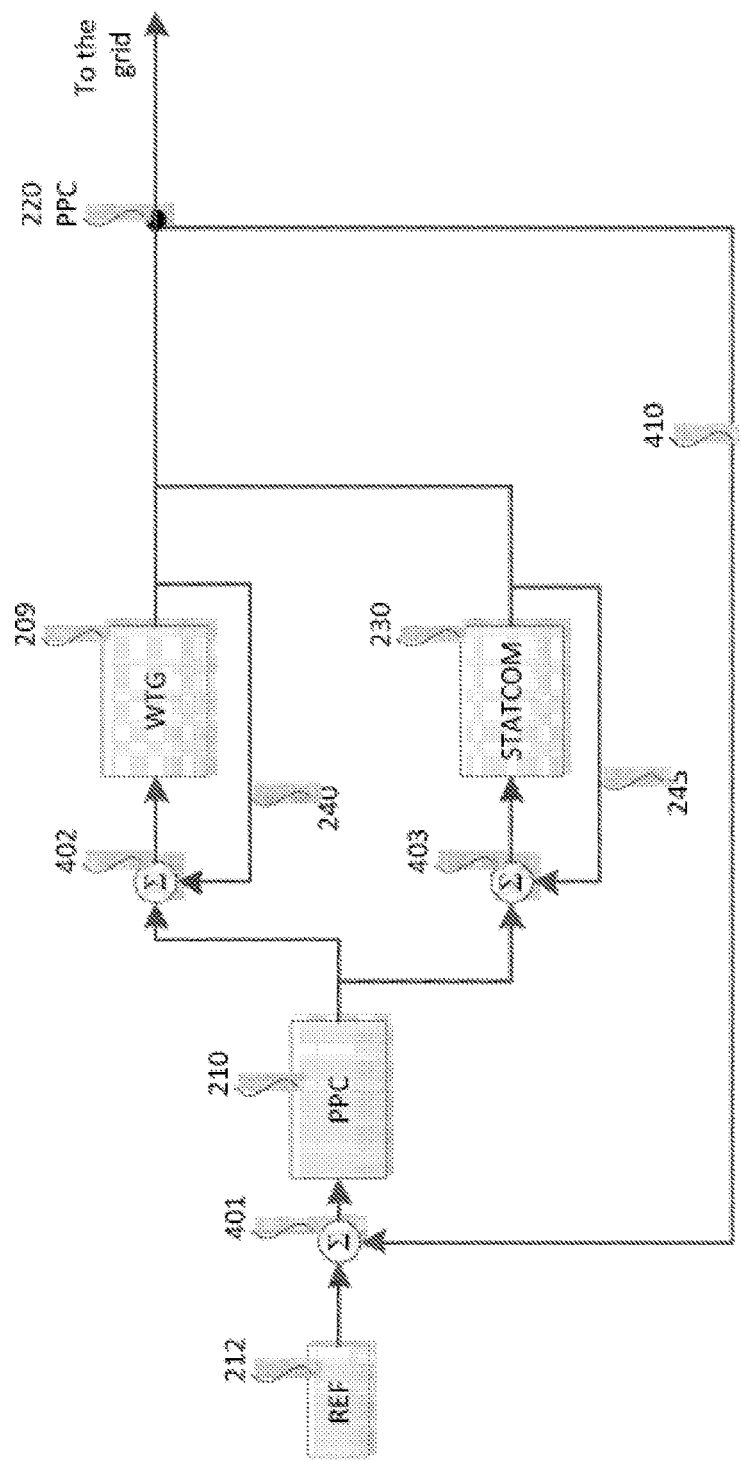
FIG. 4 shows the voltage controllers in a wind power plant with a STATCOM.

FIG. 4 shows a wind power plant with a STATCOM 230 to provide additional reactive power support. The WTG 209 has a feedback control loop 240 as described under FIG. 2. The STATCOM 230 also has a feedback loop 245. The feedback loops 240 and 245 are with high bandwidths, where the bandwidth 245 is higher than the bandwidth 240. The power plant controller 210 provides the outer feedback loop 250, with the lower bandwidth.

In an embodiment the STATCOM 230 operates as the master controller on its own and the PPC 210, which allows the STATCOM 230 to do the control, within a STATCOM controller based on the STATCOMs capability instead of the PPC 210 controlling the STATCOM voltage level. The PPC 210 still controls turbines for a target of reactive power Qturbines=(Qtotal required−Q delivered by STATCOM).

In an embodiment the user has the option to enable the automatic reconfiguration of the reactive power loop, in case the STATCOM master/slave controls mode changes.

The change of control mode for the STATCOM going from slave to master or master to slave is controlled by a trigger. The trigger can be implemented in the STATCOM controller and using measurements obtained from the STATCOM. In an embodiment the trigger is implemented in the PPC and/or in the STATCOM controller.

The event that trigger a change of control mode, can be voltage levels, voltage changes, need for reactive power.

In embodiments where the STATCOM is arranged to provide active power as well, a frequency signal can also be used as input for the trigger signal.

By enabling this feature, when the STATCOM control mode is switched to master, the reactive power loop will switch to feedforward mode and will receive reactive power setpoints from the STATCOM. The STATCOM is considered as master if it is operating in Qctrl, Vctrl and PFctrl mode and as slave when it operating in Qslave mode. In Qctrl, Vctrl and PFctrl mode the STATCOM controller tries to control the STATCOM to follow a setpoint generated by the STATCOM controller, whereas in Qslave mode the STATCOM controller follows a dictated reactive power reference.

Similarly, when the STATCOM control mode is switched from master to slave, the reactive power loop switches back into normal (not feedforward) mode and the STATCOM will receive reactive power setpoints from the PPC.

The following table presents the different variations between requested and actual control modes

| State | STATCOM Requested control mode | STATCOM Actual control mode |
| --- | --- | --- |
| 1 | Master | Slave |
| 2 | Master | Master |
| 3 | Slave | Slave |
| 4 | Slave | Master |

The logic of how the Reactive power loop is reconfigured for each of the states is:

State 1:
The Reactive power loop is in feedforward mode
The STATCOM is not included in the Reactive power loop
A mode mismatch alarm is activated in the STATCOM communication bus, i.e. Modbus Control interface or similar
A PPC software alarm is issued and logged
State 2:
The Reactive power loop is in feedforward mode
The STATCOM is not included in the Reactive power loop
The PPC Reactive Power loop (in feedforward mode) receives and dispatched to the WTGs the setpoint that is passed from the STATCOM
State 3:
The Reactive power loop is in closed loop mode
The STATCOM is included in the Reactive power loop
State 4:
The Reactive power loop is in closed loop mode
The STATCOM is not included in the Reactive power loop
A mode mismatch alarm is activated in the STATCOM communication bus i.e. Modbus Control interface or similar
A PPC software alarm is issued and logged For the PPC and the STATCOM to control the performance of the electrical grid in a stable manner it is important to ensure that both units agree on the control mode. Thus State 1 and State 4 have a mismatch alarm that will communicate to the PPC and the STATCOM that a disagreement of the control modes exists.

Figure 5:
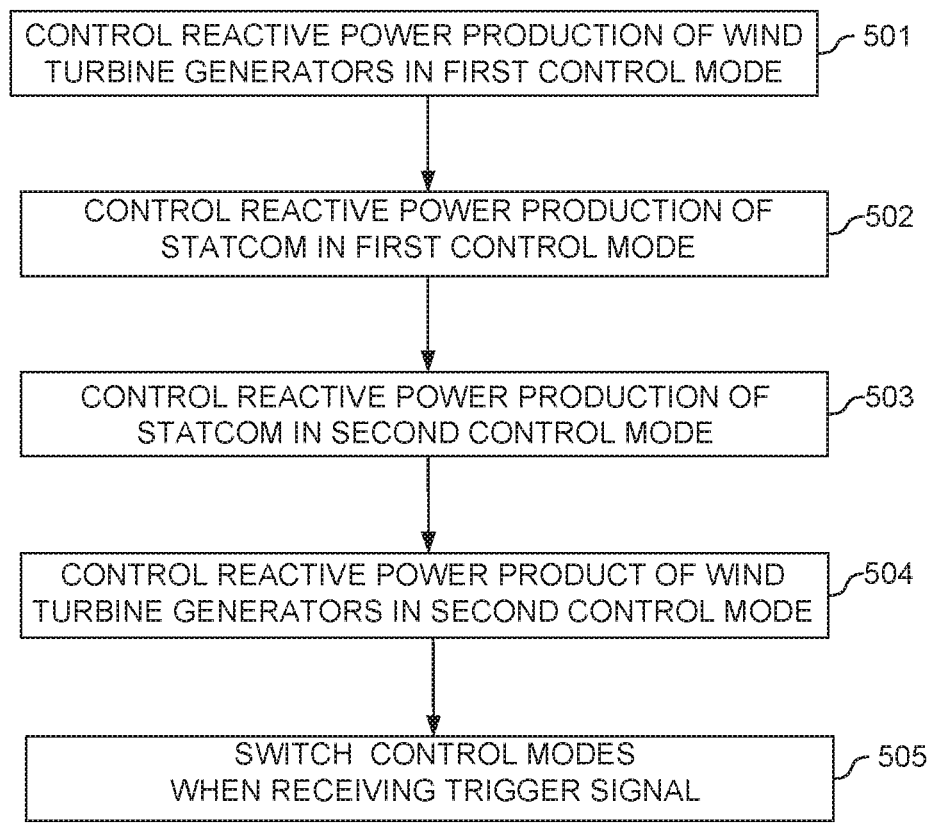
FIG. 5 shows a flow-chart of a method according to the invention.

FIG. 5 shows a flow-chart of a method according to the invention for controlling a wind power plant connected to an electrical grid, the wind power plant comprising a power plant controller, a plurality of wind turbine generators and a STATCOM, the STATCOM having a STATCOM controller, Step 501 is the controlling of the plurality of wind turbine generators in a first control mode, with the power plant controller controlling a reactive power production of each of the plurality of wind turbine generators according to a closed loop control scheme, step 502 is the controlling in the first control mode with a closed loop control scheme a reactive power production of the STATCOM according to a first setpoint dispatched from the power plant controller, step 503 is controlling the reactive power production of the STATCOM in a second control mode from the STATCOM controller according to an electrical measurement in the grid, step 504 is controlling the plurality of wind turbine generators in the second control mode, with the power plant controller controlling a reactive power production of the plurality of wind turbine generators, according to a feedforward control or a close loop control, based on a second setpoint dispatched from the STATCOM controller, and step 505 is switching between the first control mode and the second control mode when receiving at least one trigger signal.

The method shown in FIG. 5 may be carried out combined in a power plant controller 350 and in a STATCOM controller 230.

The power plant controller 350 or parts of the power plant controller may be implemented as computer program products, as electric analogue or digital circuits, or as a combination thereof. A computer program being loadable into the internal memory of at least one digital computer is executable by the computer, wherein execution/running of the program results in functions of the power plant controller 350 being carried out, or in that the steps of a method of an embodiment of the invention are performed.

In summary the invention relates to, a method for controlling a wind power plant connected to an electrical grid, the wind power plant comprises a power plant controller, a plurality of wind turbine generators and a STATCOM, with a STATCOM controller, comprises: controlling the plurality of wind turbine generators in a first control mode, with the power plant controller controlling a reactive power production from each of the plurality of wind turbine generators according to a closed loop control scheme, and controlling in a first control mode with a closed loop control scheme a reactive power production from the STATCOM according to a first setpoint dispatched from the power plant controller, and controlling the reactive power production from the STATCOM in a second control mode from the STATCOM controller according to an electrical measurement in the grid, and controlling the plurality of wind turbine generators in a second control mode, with the power plant controller controlling a reactive power production from the plurality of wind turbine generators, according to a feedforward control or a close loop control, based on a second setpoint from the STATCOM controller, and switching between the first control mode and the second control mode when receiving at least one trigger signal. The invention also relates a wind power plant according to the method.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A method for controlling a wind power plant connected to an electrical grid, the wind power plant comprising a power plant controller, a plurality of wind turbine generators and a static synchronous compensator ("STATCOM"), the STATCOM having a STATCOM controller, the method comprising:
    controlling the plurality of wind turbine generators in a first control mode, wherein in the first control mode the power plant controller is configured to act as a master controller for the wind power plant by controlling a reactive power production of each of the plurality of wind turbine generators according to a closed loop control scheme and the STATCOM controller is configured to act as a slave controller for the wind power plant by controlling, with a closed loop control scheme, a reactive power production of the STATCOM according to a first setpoint value dispatched from the power plant controller; and
    receiving a trigger signal, and in response switching from the first control mode to a second control mode, wherein in the second control mode the STATCOM controller is configured to act as the master controller for the wind power plant by controlling the reactive power production of the STATCOM according to an electrical measurement in the grid and the power plant controller is configured to act as the slave controller for the wind power plant by controlling the reactive power production of the plurality of wind turbine generators, according to at least one of a feedforward control scheme and a closed loop control scheme, based on a second setpoint value dispatched from the STATCOM controller.

2. The method according to claim 1, wherein each of the first and second setpoint values is at least one of a reactive power setpoint, a voltage setpoint or a Power Factor setpoint.

3. The method according to claim 1, wherein the power plant controller switches from the first control mode to the second control mode.

4. The method according to claim 3, wherein the method further comprises:
    synchronizing the first and second control modes of the power plant controller and the first and second control modes of the STATCOM controller; and
    communicating an alarm to the STATCOM controller and the power plant controller if the first and second control modes of the power plant controller and the first and second control modes of the STATCOM controller are not synchronized.

5. The method according to claim 1, wherein the power plant controller switches from the second control mode to the first control mode.

6. The method according to claim 5, wherein the trigger signal is triggered due to a low voltage event in the electrical grid.

7. The method according to claim 1, wherein the method further comprises:
    dispatching a feedforward setpoint to the plurality of wind turbine generators through the power plant controller.

8. The method according to claim 1, wherein the method further comprises:
    measuring an electrical parameter through a measuring point of the power plant controller; and
    calculating the trigger signal based on the electrical parameter.

9. The method according to claim 1, further comprising:
    measuring an electrical variable through a measuring point of the STATCOM; and
    calculating the trigger signal based on the electrical variable.

10. A computer program product, comprising:
    a computer-readable storage medium having computer-readable program code embodied therewith, the computer-readable program code configured to perform an operation comprising:
        controlling a plurality of wind turbine generators in a first control mode, wherein in the first control mode a power plant controller is configured to act as a master controller for a wind power plant by controlling a reactive power production of each of a plurality of wind turbine generators according to a closed loop control scheme and a STATCOM controller is configured to act as a slave controller for the wind power plant by controlling, with a closed loop control scheme, a reactive power production of the STATCOM according to a first setpoint value dispatched from the power plant controller; and
        receiving a trigger signal, and in response switching from the first control mode to a second control mode, wherein in the second control mode the STATCOM controller is configured to act as the master controller for the wind power plant by controlling the reactive power production of the STATCOM according to an electrical measurement in a grid and the power plant controller is configured to act as the slave controller for the wind power plant by controlling the reactive power production of the plurality of wind turbine generators, according to at least one of a feedforward control scheme and a closed loop control scheme, based on a second setpoint value dispatched from the STATCOM controller.

11. A wind power plant connectable to an electrical grid, the wind power plant comprising a plurality of wind turbine generators, a power plant controller, a trigger, and a STATCOM, the STATCOM having a STATCOM controller, wherein:

the power plant controller is arranged to control the plurality of wind turbine generators in a first control mode, wherein in the first control mode the power plant controller acts as a master controller for the wind power plant by controlling a reactive power production of each of the plurality of wind turbine generators according to a closed loop control scheme;

the STATCOM controller is arranged to, in the first control mode with a closed loop control scheme, act as a slave controller for the wind power plant by controlling a reactive power production of the STATCOM according to a first setpoint value dispatched from the power plant controller; and the trigger is arranged to receive a trigger signal, and in response switch from the first control mode to a second control mode, wherein in the second control mode the STATCOM controller is arranged to act as the master controller for the wind power plant by controlling the reactive power production of the STATCOM according to an electrical measurement in the grid and the power plant controller is arranged to act as the slave controller for the wind power plant by controlling the reactive power production of the plurality of wind turbine generators, according to at least one of a feedforward control scheme and a closed loop control scheme, based on a second setpoint value dispatched from the STATCOM controller.

* * * * *